Jan. 2, 1945.  E. R. BARRETT  2,366,378
INDUSTRIAL TRUCK
Filed June 21, 1943  6 Sheets-Sheet 6
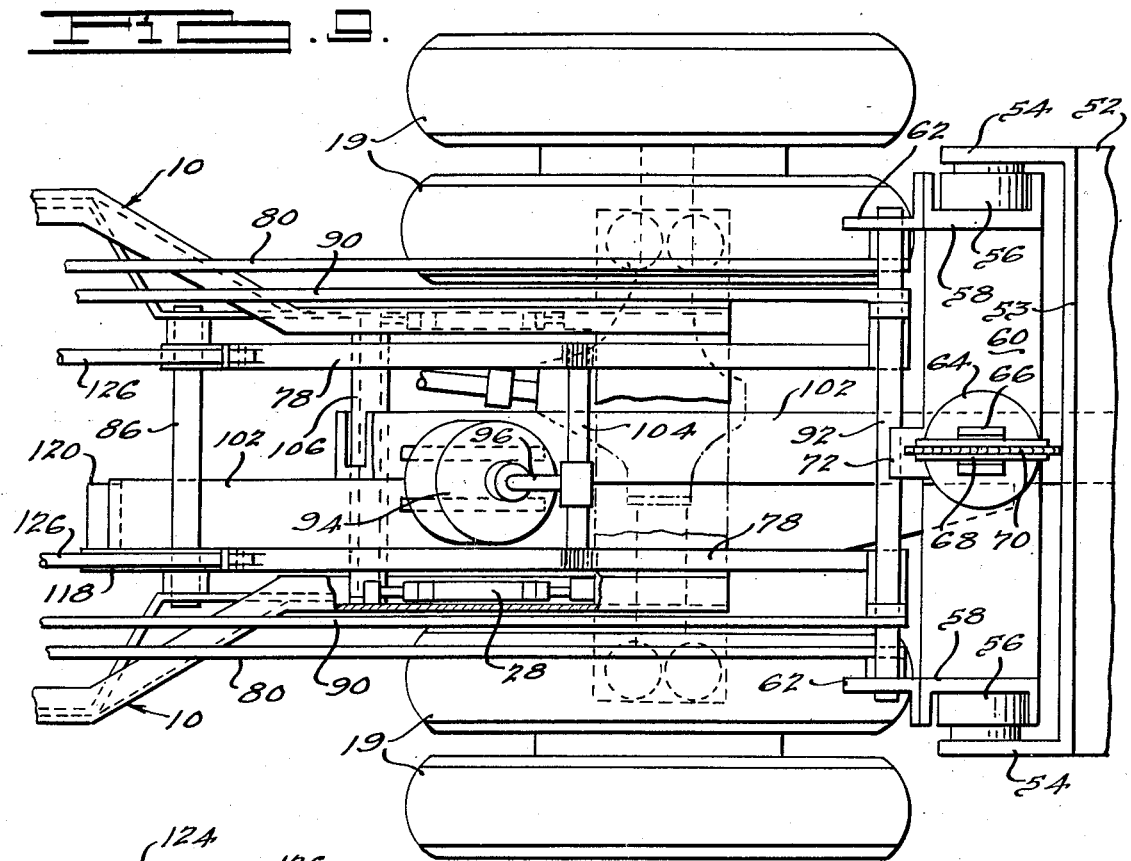
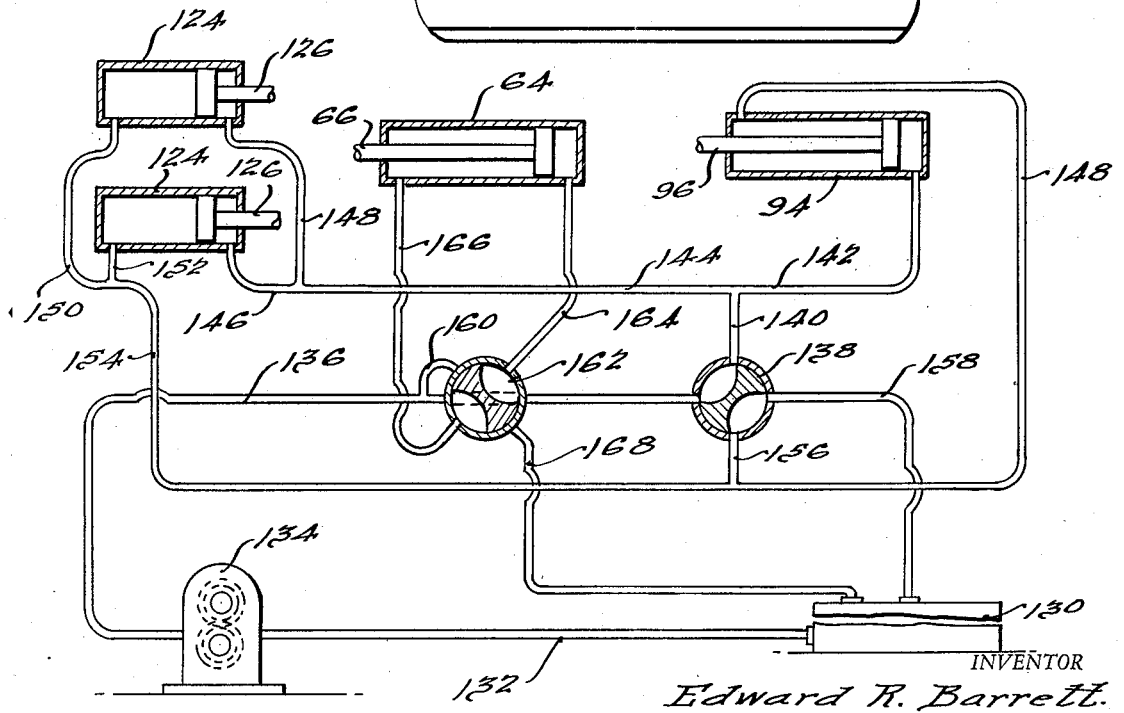
INVENTOR
Edward R. Barrett.
BY
Harness, Dickey & Pierce.
ATTORNEYS.

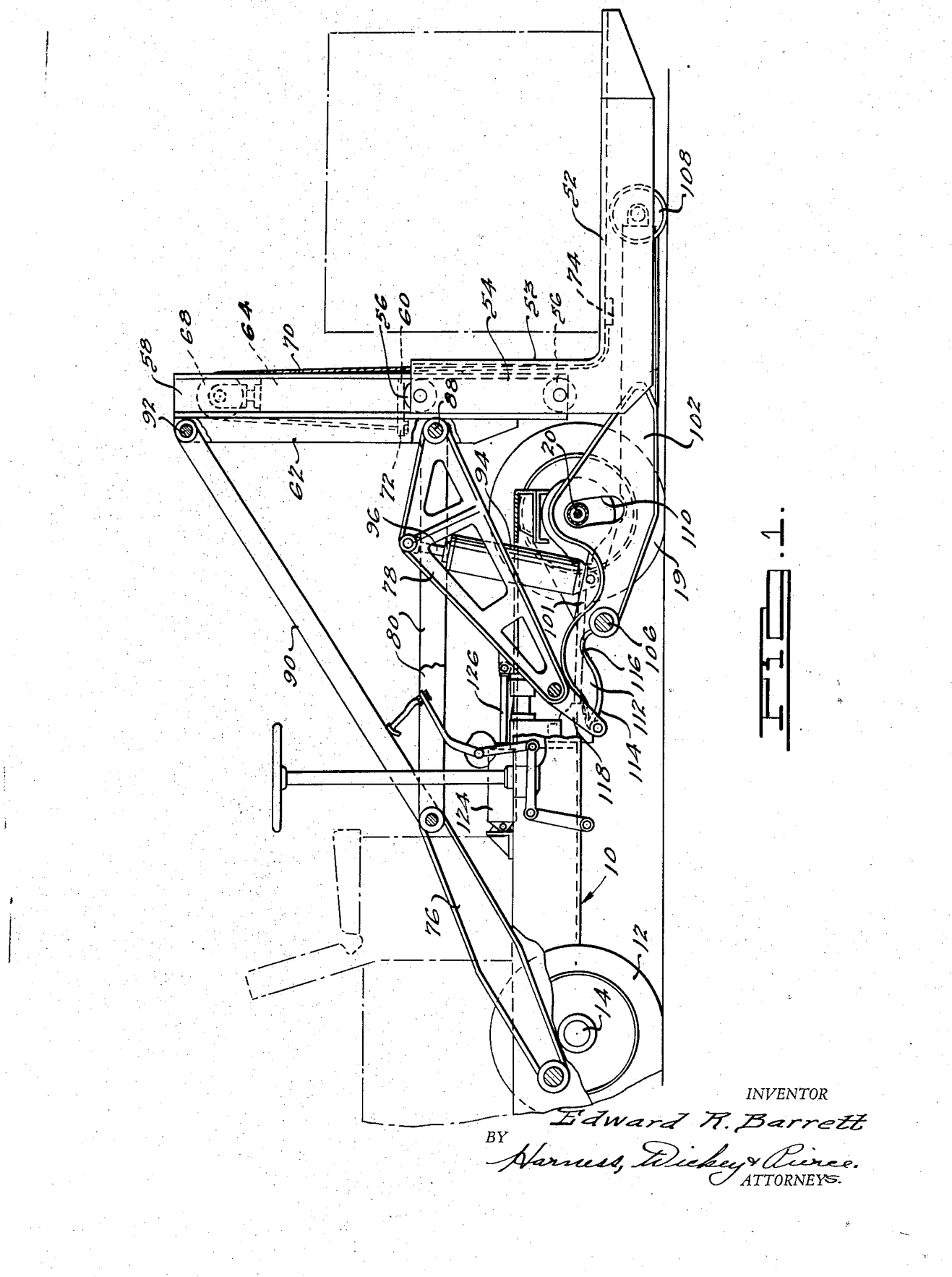

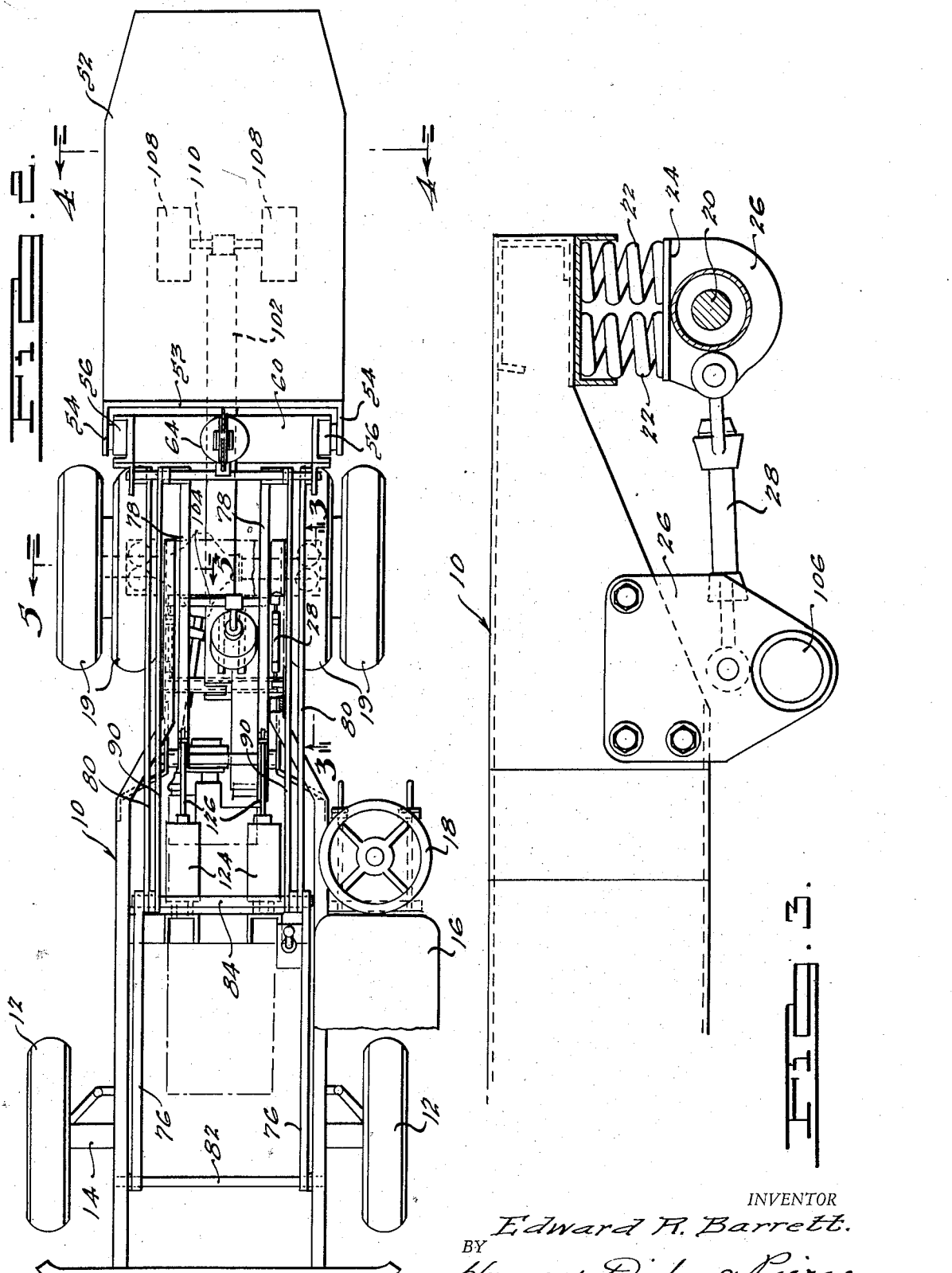

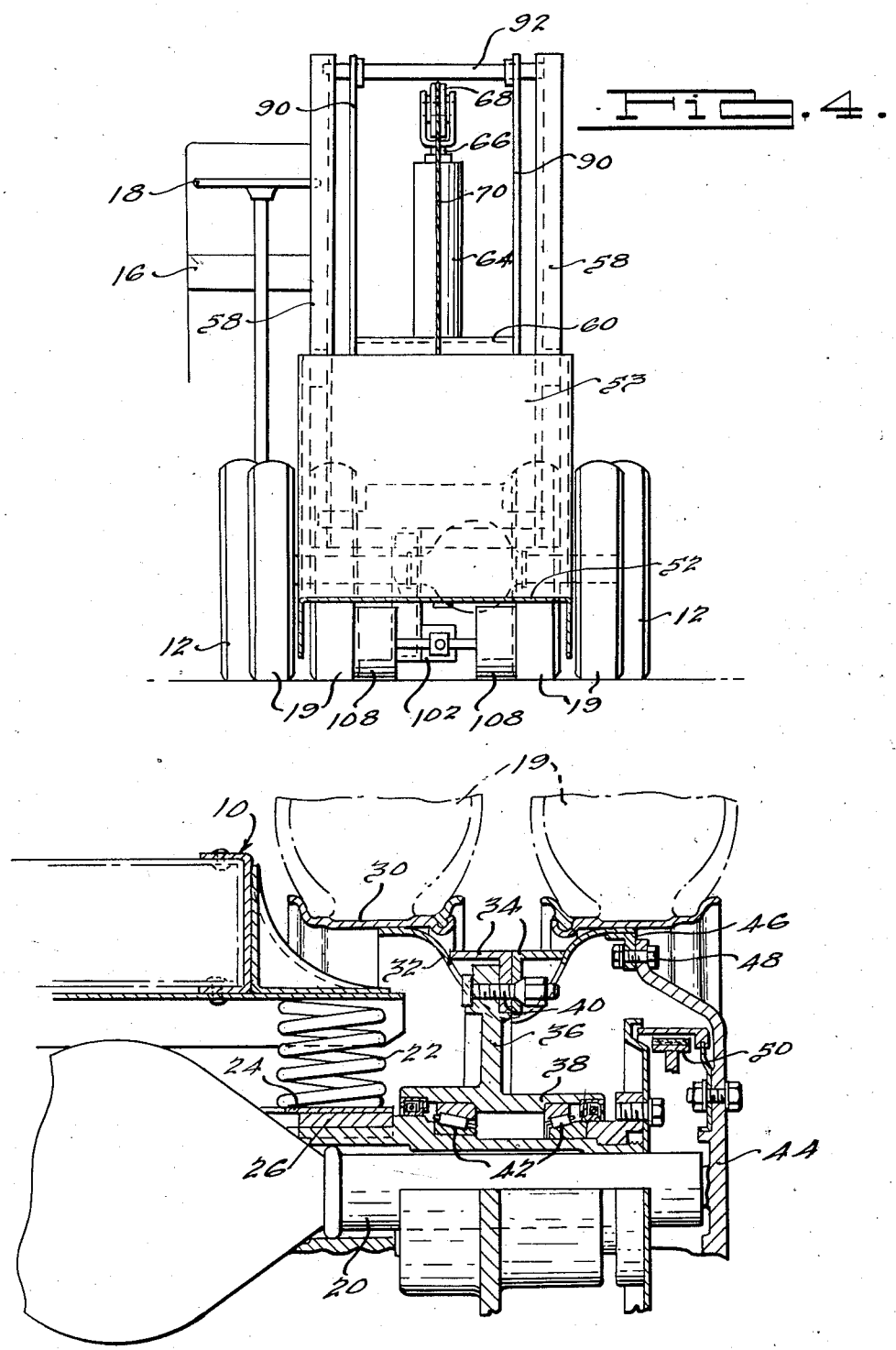

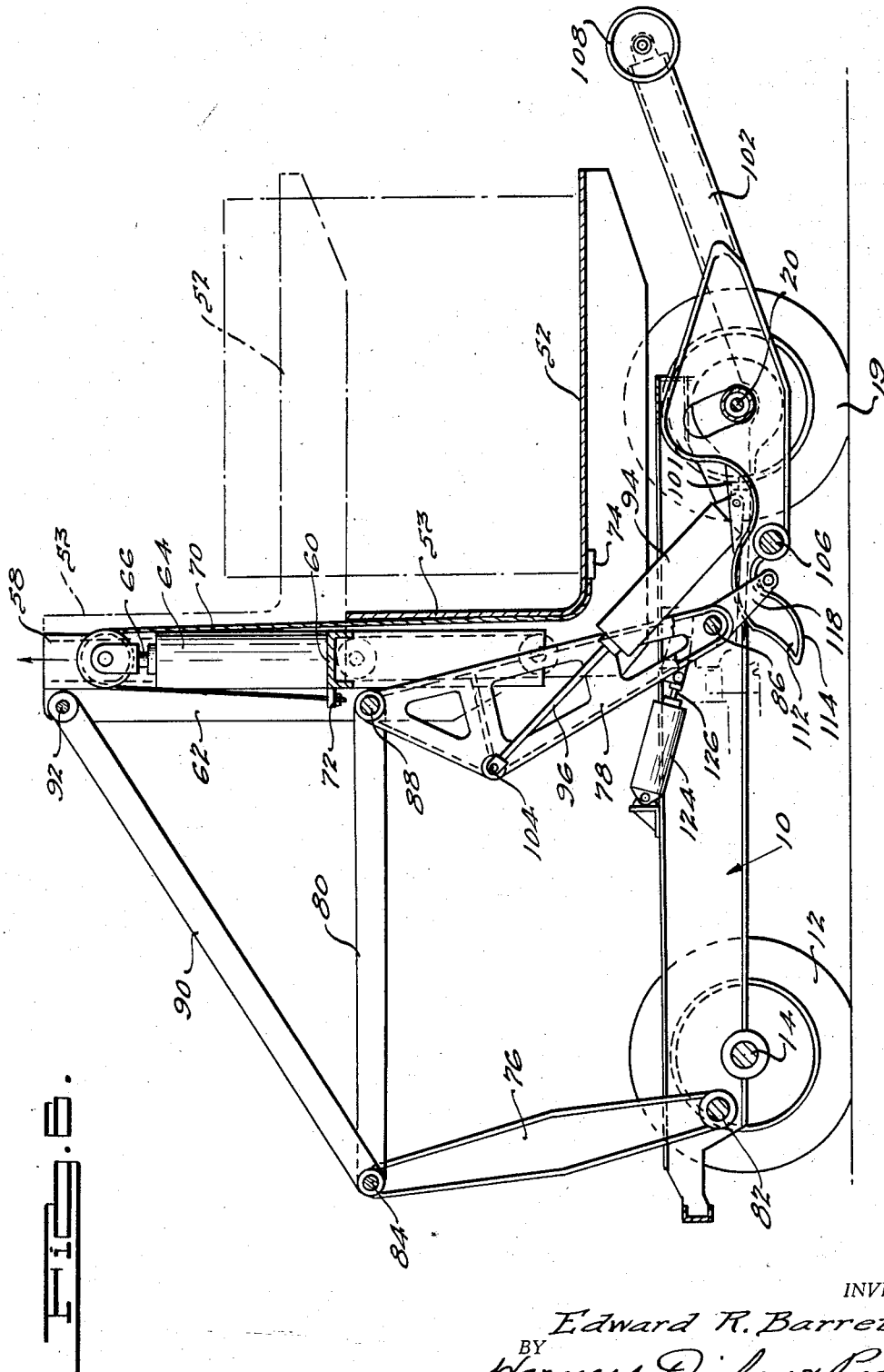

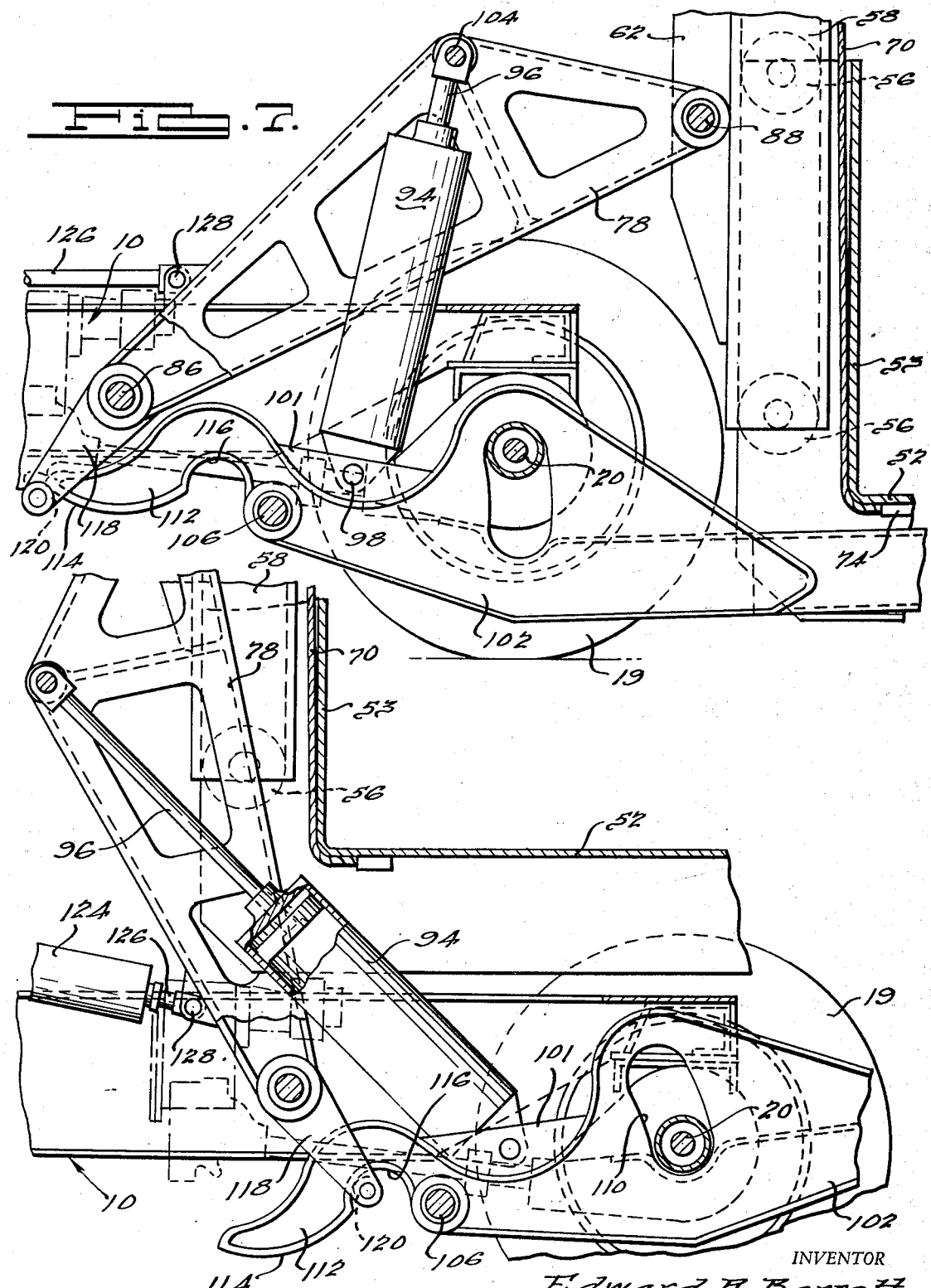

Patented Jan. 2, 1945

2,366,378

UNITED STATES PATENT OFFICE 2,366,378

INDUSTRIAL TRUCK

Edward R. Barrett, Detroit, Mich., assignor to Gar Wood Industries, Inc., Detroit, Mich., a corporation of Michigan Application June 21, 1943, Serial No. 491,617

20 Claims. (Cl. 214—113)

The present invention relates to vehicles and particularly relates to improvements in the type of vehicles known variously as industrial trucks, mechanical trucks, or lift trucks.

One of the primary objects of the present invention is to provide improvements in trucks of the type mentioned whereby such trucks carry the load in an improved manner and may be used on rough or uneven ground surfaces with less danger of injury to the load or wear on the truck than in prior structures.

A further object of the invention is to provide improvements in trucks of the type mentioned whereby the trucks have improved riding characteristics over prior structures, particularly when loaded.

Another object of the invention is to provide improvements in trucks of the type mentioned in which the load carrying platform and the platform supporting frame are raised from a loading position to a carrying position, so that in the carrying position the load is disposed between the ground wheel axles of the truck without changing the relative position of the platform with respect to the supporting frame, with the result that during transporting of the load such load has a low center of gravity between the ground wheel axles.

A further object of the invention is to provide improvements in trucks of the type mentioned whereby the load carrying platform may be raised from a loading position to a carrying position without tilting the platform and so that in the carrying position the load is disposed between the ground wheel axles of the truck.

A further object of the invention is to provide improvements in trucks of the type mentioned in which a load supporting outrigger is provided in such relation to the loading platform and the truck frame that during loading and in moving the load between loading and carrying positions reaction forces are established which prevent tipping of the truck.

A further object of the invention is to provide improvements in trucks of the type mentioned in which all of the ground engaging wheels of the truck chassis may be of the type to use pneumatic tires, thereby improving riding qualities of the truck and making it useful in places where prior trucks of this type could not be used.

Other objects of the invention will become apparent from the following specification, the drawings relating thereto, and from the claims hereinafter set forth.

In the drawings, in which like numerals are used to designate like parts in the several views throughout:

Figure 1 is a side elevational view of an industrial lift truck, with parts removed and showing parts in elevation, embodying features of the present invention;

Figure 2 is a top plan view of the structure shown in Figure 1;

Figure 3 is an enlarged cross-sectional view taken substantially along the line 3—3 of Figure 2;

Figure 4 is a cross-sectional view taken substantially along the line 4—4 of Figure 2;

Figure 5 is an enlarged, cross-sectional view taken substantially along the line 5—5 of Figure 2;

Figure 6 is an enlarged cross-sectional and elevational view of a portion of the structure shown in Figure 1, and showing the elements with the loading platform in its load carrying position;

Figure 7 is an enlarged side elevational view of a portion of the structure shown in Figure 1 and showing the parts in greater detail;

Figure 8 is a view similar to Figure 7 and showing the parts in another position, that is, the load carrying position;

Figure 9 is an enlarged plan view of a portion of the structure shown in Figure 2 and showing the parts in greater detail; and Figure 10 is a diagrammatic view of the hydraulic system employed with the structure of the present invention.

In general, in the use in trucks of the type to which the present invention is directed, a movable loading platform is provided which is so mounted with respect to the truck frame that the platform may be disposed at a relatively low loading position and may thereafter be raised to a carrying position. The platform is mounted upon a frame and is connected thereto so that the platform may be vertically moved with respect to the frame to load or unload at different elevations.

According to the present invention, a truck is provided having ground engaging wheels of the same size and of a size adaptable for the use of pneumatic tires thereon. The load carrying platform is mounted on a frame for vertical movement with respect thereto so that it may be loaded or unloaded at various elevations. The platform and its supporting frame are mounted on the truck in such a way that the platform may be disposed at a low loading position and may then be raised to a carrying position which is so located that the center of the load on the platform is disposed between the wheel axles. The connection between the platform and the vehicle frame, in the specific embodiment described, includes a parallelogram linkage connection and is such that as the platform moves between the loading and carrying positions such platform maintains a fixed relation with respect to the horizontal. That is, in the specific embodiment shown the platform is horizontal so that at all times, either in or moving between the loading and carrying positions, it remains horizontal. In this way the load is not tilted and the load may be carried between the two axles with a relative low center of gravity.

In prior structure it has been the practice to counterweight the end of the truck opposite to that which carries the load so that the truck will not tilt when loading, carrying or moving between the loading and carrying positions. So far as the carrying position is concerned in the structure of the present invention, no counterweight is necessary, in that the load on the platform is carried between the two axles. When loading, the platform is disposed outwardly of one of the axles; and, according to the present invention, in order to prevent tipping during loading or during movement between the loading and carrying positions, a ground engaging member is provided. Such ground engaging member extends under the load carrying platform to a position outside of the adjacent axle and is pivotally connected to the vehicle frame at a position between the vehicle axles. Means are provided interconnecting the ground engaging members and the linkage connecting the platform to the vehicle of such a nature that when the load on the platform is disposed outwardly of the adjacent axle, reaction forces are set up through the ground engaging member and the interconnecting means which will prevent the body from tipping about the adjacent axle. In this structure, the greater the tendency is to tilt, the greater will be the reaction forces to prevent tilting.

By the use of pneumatic tires and by the use of a structure which permits the load to be carried between the vehicle axles and without tipping, a loading structure is provided which has many advantages over prior art structures. The handling of the load onto and off of the truck can be more readily accomplished and the load may be carried in a better manner. Such characteristics are more important today than they were in the past and are becoming more and more important, in that vehicles of this type are finding many more uses then heretofore. For example, with the development of air freight, a vehicle, according to the present invention, would be useful in that it could be readily used on airfields and on relatively rough terrain. Furthermore, with the size that factories are now being built covering large areas, inter-factory transportation of parts and materials is more of a problem than it has been in the past and such loads must be carried over greater distances. The riding qualities of the truck are, therefore, more important than they have been.

For a better understanding of the present invention, reference may be had to the accompanying drawings, in which one embodiment is illustrated. In the drawings, an industrial lift truck is illustrated which includes an automative chassis frame generally indicated at 10. Such chassis frame may be of suitable construction and includes the usual longitudinal and cross members. An engine is mounted on the chassis adjacent one end thereof in the usual way. Dirigible wheels 12 are mounted adjacent one end of the chassis 10 on an axle 14 for steering the vehicle. A driver's seat 16 is mounted on one side of the chassis behind a steering wheel 18 and in the present embodiment the seat 16 faces away from the axle 14. The steering wheel 18 may be connected to the steering mechanism for wheels 12 in a suitable manner.

Dual wheels 19 are mounted on a drive axle 22 adjacent the opposite end of the frame 10. Such opposite end of the frame 10 is supported on the housing of drive axle 20 by means of springs 22 on opposite sides of the chassis which rest upon plates 24 of brackets 26. Each of such brackets 26 may be fixed to the axle housing and the forward end of each of such brackets is pivotally connected to a depending bracket 26 mounted on frame 10 inwardly of the axle 20 by means of a radius rod 28. Each of the wheels of each pair of dual wheels 19 is removably mounted on a tire flange 30 in the usual way and a central web 32 is fixedly secured to the flange 30. An annular angle member 34 is welded to the web 32 and the angle members of the pairs may be positioned with respect to each other, as shown in Fig. 5, and secured to the radial portion 36 of wheel hub 38 by means of nuts and bolts indicated at 40. Such nuts and bolts may be passed through aligned openings provided in the webs 32 and through aligned openings in the angle members 34. The hub 38 is rotatably mounted on the axle housing by means of radial thrust bearings 42. Each outer wheel may be connected to the drive axle 20 through an end plate 44. Such end plate 44 may be connected to an annular angle member 46 which is welded or otherwise secured to the rim of the outer wheel by means of bolts 48 or the like. Suitable braking means may be provided on the wheel and such braking means is diagrammatically and generally indicated at 50.

It is to be understood that while one type of chassis frame has been illustrated, the present invention is adapted for use with conventional truck frames, particularly the frames of the smaller trucks.

The loading, carrying, and handling means include an horizontal loading platform 52 having a vertical back 53 terminating in longitudinally extending sides 54. Inwardly directed, vertically spaced rollers 56 are pivotally mounted to each side 54 and are adapted to be received within the outwardly directed guide channels of vertically extending channel shaped frame members 58. Such channel shaped frame members 58 are connected together by means of a transverse frame member 60 and may be suitably braced. Upstanding angle members 62 are fixed to the inner sides of the channel members 58 for connection of the supporting frame and the platform with the vehicle in a manner that will be described hereinafter.

It will be understood that the platform 52 is adapted to be vertically moved with respect to the frame 58. During such vertical movement the rollers 56 roll within the channels of members 58, and suitable means may be provided for raising and lowering the platform 52 with respect to its supporting frame. This may be accomplished by a number of different mechanisms and for the purpose of illustration one suitable means is shown. Such means includes an hydraulic jack, including a cylinder 64, with its lower end mounted on the frame member 60.

A piston rod 66 projects through the head end of the cylinder and has a pulley 68 pivotally attached to the forked upper end thereof. A cable 70, having one end thereof secured to the frame 60, as indicated at 72, is trained about the pulley 68 and has the opposite end thereof connected to the platform 52, as indicated at 74. It will be appreciated that when fluid under pressure is admitted to the lower end of the cylinder 64, the piston rod is extended so that the cable 70 pulls the platform 52 upwardly with respect to the supporting frame. When fluid pressure on the lower end of the cylinder is released, the platform will return to its lower position.

Means are provided for interconnecting the platform 52 and the supporting frame 58 with the vehicle for bodily movement with respect thereto. Such means includes a parallelogram linkage structure disposed on each side of the vehicle frame so that when the platform is moved from its loading position, shown in Fig. 1, to a carrying position, shown in Fig. 6, the platform 52 retains its horizontal position at all times. Each of such parallelogram linkage structures includes parallel links 76 and 78 and an interconnecting link 80 which is parallel to the longitudinal members of chassis 10.

Each link 76 is pivotally connected to the chassis 10 by means of a transversely extending pivot shaft 82 which is mounted to the chassis 10. The links 76 are pivotally connected to the link 80 by means of a transversely extending pivot shaft 84. The links 78 are pivotally connected to the chassis 10 by means of a transversely extending pivot shaft 86 which is mounted to the longitudinal members of the chassis. The links 78 are pivotally connected to the links 80 by means of a transversely extending pivot shaft 88 which is mounted on the angle members 62 of the platform frame.

In order to triangularly brace the platform frame a strut 90 is disposed at each side of the vehicle adjacent the links 80 and is pivotally connected adjacent its lower end to the pivot shaft 84. The upper end of the strut 80 is connected to the upper ends of frame member 62 by means of a transverse rod 92. The members 62 are thus braced in a vertical position during movement of the platform and platform frame between loading and carrying positions.

The power means for moving the platform and platform frame between loading and carrying positions, comprises an hydraulic jack, including a cylinder 94 having a piston rod 96 extending through the head end thereof. Such jack is disposed at substantially the transverse center of the vehicle; and the lower end of the cylinder 94 is pivotally connected, by means of pivot pin 98, to a bracket 101 which is secured to a ground engaging member 102. The location of such pivotal connection and the function of the ground engaging member will be described in detail hereinafter.

The outer end of the piston rod 96 is pivotally connected to the link 78 by means of a pivot shaft 104 which extends transversely of the vehicle between members 78. The members 78 are triangular in shape with the pivot shaft 104 connected thereto at the apex of the triangle between pivots 86 and 88. When power is applied to the lower end of the cylinder, the links 78 are moved in a counter-clockwise direction and the table 52 and frame are bodily moved from the position shown in Fig. 1 to the position shown in Fig. 6. When power is applied to the opposite end of the cylinder 94, the platform and frame are reversely moved from the position shown in Fig. 6 to that shown in Fig. 1. Due to the interconnection between the platform frame and the chassis, which in the specific embodiment described is a parallelogram linkage, the table 52 remains horizontal at all times. The interconnection is also such that when the table 52 is in its carrying position, the center of the load on platform 52 is disposed to the inside of axle 20. Thus, during carrying, the vehicle will not tilt and counterweights at the opposite end of the vehicle are unnecessary.

In order to prevent tilting when the platform is in its loading position and when it is moving between the loading and carrying position, without the need of counterweights, the ground engaging member 102 is provided. Such ground engaging member 102 is formed in two, transversely off-set parts but may be considered as a single part so far as the present invention is concerned. It will be seen that such member 102 is pivotally connected to the bracket 26 by means of a transversely extending pivot shaft 106. Such pivot shaft is located between axles 14 and 20 and the member 102 extends to a position outside of axle 20 under the loading platform 52 when such platform is in its loading position. The member 102 has ground engaging wheels or rollers 108 connected to the outer end thereof by means of a shaft 110, and is of such a length that it extends far enough under the platform 52 so that the center of the load is between ground wheels 108 and 19.

The member 102 is provided with an elongated arcuate slot 110, having as its center the center of a shaft 106, and the slot 110 receives the axle shaft 20 and shaft housing therethrough so that the member 102 has limited, but sufficient, pivotal movement about the pivot 106.

The member 102 is also formed with an extension 112 on the opposite side of the pivot 106 which is formed with an under cam surface 114. Such cam surface 114 terminates adjacent the pivot 106 in a recess 116, which has a function that will be mentioned later.

The inner end of one of the links 78 has an integral extension 118 and an inwardly directed roller 120 is mounted to the lower end of such extension 118. Such roller is adapted to engage the cam surface 114 for the major portion of the travel of the platform and frame between loading and carrying positions and at the end of such movement to the carrying position, the roller is received within the recess 116. The purpose of the recess 116 is to permit raising movement of the ground member 102.

The action of the ground member to prevent tilting of the body in movement of the platform from its carrying to loading position, is best seen in Figs. 7 and 8. In Fig. 7 the platform is shown in its loading position and in such position the roller 120 is in engagement with the toe of cam surface 114. The pivot 98, at the lower end of cylinder 94, is mounted to bracket plates 101 which are fixed to the upper surface of member 102 and located between pivot 106 and shaft 20. The thrust on member 102 is thus between the pivot 106 and shaft 20 and when power is applied to the lower end of cylinder 94, the member 102 is forced down toward the ground so that the wheels 108 are forced into engagement with the ground. As the piston rod 96 is extended, the roller 120 rides along the cam surface 114. Any tendency of the load to tip the truck about axle 20 would be resisted by the re-action force of the cam surface 114 against the roller 120 to pull the chassis, to which pivot 86 is fixed, in a counterclockwise direction about shaft 20. The greater the tipping tendency the greater would be this re-action force to prevent tipping.

When the piston rod 96 is fully extended, as shown in Fig. 8, the body is in its carrying position and the ground engaging member 102 has been raised off the ground. The full extension of the jack, including cylinder 94 and rod 96, could not raise the ground member 102 off the ground; and in order to do this, auxiliary hydraulic jacks, including a cylinder 124 and piston rod 126, are disposed along opposite sides of the chassis frame 10. The end of each piston rod 126 is pivotally connected to the link 78 by means of a pivot 128 with such pivot pin located between pivots 86 and 84. When the cylinder 94 and piston rod 96 have reached their limit of extension, it will be appreciated that such elements form a link between members 78 and 102 so that when fluid under pressure is admitted to the head end of cylinder 124, the piston rod 126 moves inwardly and acts through links 78 and piston rod 96 and cylinder 94 to raise the member 102 about pivot 106. Such movement is permitted against roller 102 since during that period the roller 120 is received within the recess 116 which permits movement of the member 102 with respect to the roller 120.

Referring to Fig. 10, an hydraulic circuit for operating the various hydraulic jacks is diagrammatically illustrated. Such circuit includes a tank or reservoir 130 adapted to contain a supply of fluid, such as oil. A conduit 132 communicates with the lower end of the tank 130 and also communicates with the inlet of a pump, such as a gear pump 134. The pump 134 may be driven from a prime mover, such as the automatic engine of the truck, through a suitable power take-off. The outlet of the pump communicates with a conduit 136, which in turn communicates with the inlet of a valve 138 for controlling the operation of jacks 94 and 124. With the valve 138 set as shown the fluid from the valve passes out of conduit 140 into branch conduits 142 and 144. Conduit 142 communicates with the base end of cylinder 94 and conduit 144 communicates through branch conduits 146 and 148 with the cap ends of cylinders 124. The opposite end of cylinder 94 communicates with conduit 148; and, the opposite ends of cylinders 124 communicate through branch conduits 150 and 152 with conduit 154. Conduits 148 and 154 communicate with valve 138 through a conduit 156 which communicates through the valve, in the position shown, with a return conduit 158. The return conduit 158 communicates with the tank 130.

With the valve 138 set, as shown, fluid under pressure passes from pump 134 through conduit 136, through valve 138 and into cylinder 94 through conduit 142. Such fluid also communicates through conduits 144, 146, and 148 with the cap ends of cylinders 124. The piston 96 is extended to move the platform from its loading to its carrying position; and, when the piston 96 reaches its full extent of movement the fluid pressure will then act upon pistons 126 to move them inwardly and cause the ground engaging member 102 to move upwardly. Fluid from the opposite ends of cylinders 94 and 124 returns to the tank through conduit 158.

For powering in the opposite direction, valve 138 may be shifted so that conduits 136 and 156 are in communication and conduits 140 and 158 are in communication. When in that position of the valve 138 the fluid under pressure will be admitted to the opposite ends of cylinders 94 and 124 to power such jacks in the opposite directions. The fluid exhausts through the opposite ends of the cylinders and returns through conduit 158 to the tank.

For operating the jack 64 to raise and lower the platform 52 with respect to its supporting frame, the conduit 136 communicates through a branch inlet conduit 160 with a valve 162. With the valve in the position shown, the entry of fluid to the valve 162 is shut off but the valve may be turned so that conduit 160 communicates with conduit 164 which communicates with the base end of cylinder 64. Fluid under pressure, thus admitted through conduit 154 will raise the piston 66 to raise the platform 52. Fluid from the opposite end of cylinder 164 exhausts through conduit 166 through valve 162 and through conduit 168 back to the tank 138. Cylinder 64 need only be powered in the one direction.

In the specific embodiment described above, the mechanism for controlling the movement of the platform and platform frame between the loading and carrying positions, has been specifically described with respect to a truck. However, the platform and platform frame could similarly be mounted on a trailer or semi-trailer, if so desired.

What is claimed is:

1. In a vehicle of the type described in which a vehicle frame is provided having ground engaging wheels mounted on longitudinally spaced axles connected to said frame, the combination of, a load supporting platform, movable means interconnecting said platform with said frame for raising movement between a loading position to the outside of said axles and a carrying position with the load between said axles, said interconnecting means being so constructed that said platform maintains a fixed relation to the horizontal when in and moving between said positions, and means for moving said movable means to thereby move said platform between said positions.

2. In a vehicle of the type described in which a vehicle frame is provided having ground engaging wheels mounted on longitudinally spaced axles connected to said frame, the combination of, a horizontal load supporting platform, movable means interconnecting said platform with said frame for raising movement between a loading position to the outside of said axles and a carrying position with the load between said axles, said interconnecting means being so constructed that said platform is maintained horizontal when in and moving between said positions, and means for moving said movable means to thereby move said platform between said positions.

3. In a vehicle of the type described in which a vehicle frame is provided having ground engaging wheels mounted on longitudinally spaced axles connected to said frame, the combination of, a load supporting platform, a platform supporting frame, means mounting said platform on said frame, movable means interconnecting said platform frame with said vehicle frame for bodily raising movement of said platform and platform frame between a loading position to the outside of said axles and a carrying position with the load between said axles, said interconnecting means being so constructed that said platform maintains a fixed relation to the horizontal when in and moving between said positions, and means for moving said movable means to thereby bodily move said platform and platform frame between said positions.

4. In a vehicle of the type described in which a vehicle frame is provided having ground engaging wheels mounted on longitudinally spaced axles connected to said frame, the combination of, a load supporting platform, an upstanding platform supporting frame, means mounting said platform for vertical movement on said platform frame, movable means interconnecting said platform frame with said vehicle frame for bodily raising movement of said platform and platform frame between a loading position to the outside of said axles and a carrying position with the load between said axles, said interconnecting means being so constructed that said platform maintains a fixed relation to the horizontal when in and moving between said positions, and means for moving said movable means to thereby bodily move said platform and platform frame between said positions.

5. In a vehicle of the type described in which a vehicle frame is provided having ground engaging wheels mounted on longitudinally spaced axles connected to said frame, the combination of, a horizontal load-supporting platform, an upstanding platform-supporting frame, means mounting said platform for vertical movement on said platform frame, movable means interconnecting said platform frame with said vehicle frame for bodily raising movement of said platform and platform frame between a loading position to the outside of said axles and to a carrying position with the load between said axles, said interconnecting means being so constructed that said platform is maintained horizontal when in and moving between said positions, and means for moving said movable means to thereby bodily move said platform and platform frame between said positions.

6. In a vehicle of the type described in which a vehicle frame is provided having ground engaging wheels of substantially the same size mounted on longitudinally spaced axles connected to said frame, the combination of, a load supporting platform, movable means interconnecting said platform with said frame for raising movement between a loading position to the outside of said axles and a carrying position with the load between said axles, said interconnecting means being so constructed that said platform maintains a fixed relation to the horizontal when in and moving between said positions, and means for moving said movable means to thereby move said platform between said positions.

7. In a vehicle of the type described in which a vehicle frame is provided having pneumatically tired ground engaging wheels of substantially the same size mounted on longitudinally spaced axles connected to said frame, the combination of, a load supporting platform, movable means interconnecting said platform with said frame for raising movement between a loading position to the outside of said axles and a carrying position with the load between said axles, said interconnecting means being so constructed that said platform maintains a fixed relation to the horizontal when in and moving between said positions, and means for moving said movable means to thereby move said platform between said positions.

8. In a vehicle of the type described in which a vehicle frame is provided having ground engaging wheels mounted on longitudinally spaced axles connected to said frame, the combination of, a load supporting platform, movable means interconnecting said platform with said frame for raising movement between a loading position to the outside of said axles and a carrying position with the load between said axles, said interconnecting means including a parallelogram linkage so constructed and connected to said platform and frame that said platform maintains a fixed relation to the horizontal when in and moving between said positions, and means for moving said movable means to thereby move said platform between said positions.

9. In a vehicle of the type described in which a vehicle frame is provided having ground-engaging wheels mounted on longitudinally spaced axles connected to said frame, the combination of, a load-supporting platform, a platform-supporting frame, means mounting said platform on said frame, movable means interconnecting said platform frame with said vehicle frame for bodily raising movement of said platform and platform frame between a loading position to the outside of said axles and a carrying position with the load between said axles, said interconnecting means including a parallelogram linkage so constructed and connected with said platform frame that said platform maintains a fixed relation to the horizontal when in and moving between said positions, and means for moving said movable means to thereby bodily move said platform and platform frame between said positions.

10. In a vehicle of the type described in which a vehicle frame is provided having ground engaging wheels mounted on longitudinally spaced axles connected to said frame, the combination of, a horizontal load-supporting platform, an upstanding platform-supporting frame, means mounting said platform for vertical movement on said platform frame, movable means interconnecting said platform frame with said vehicle frame for bodily raising movement of said platform and platform frame between a loading position to the outside of said axles and to a carrying position with the load between said axles, said interconnecting means including a parallelogram linkage so constructed and connected to said platform frame that said platform is maintained horizontal when in and moving between said positions, and means for moving said movable means to thereby bodily move said platform and platform frame between said positions.

11. In a vehicle of the type described in which a vehicle frame is provided having ground engaging wheels mounted on longitudinally spaced axles connected to said frame, the combination of, a load supporting platform, movable means interconnecting said platform with said frame for raising movement between a loading position to the outside of said axles and a carrying position with the load between said axles, a movable ground engaging member disposed under said platform when in the loading position, means connecting said member to said frame, means for moving said member into and out of engagement with the ground, and means for moving said movable means to thereby move said platform between said positions.

12. In a vehicle of the type described in which a vehicle frame is provided having ground-engaging wheels mounted on longitudinally spaced axles connected to said frame, the combination of, a load-supporting platform, a platform-supporting frame, means mounting said platform on said frame, movable means interconnecting said platform frame with said vehicle frame for bodily raising movement of said platform and platform frame between a loading position to the outside of said axles and a carrying position with the load between said axles, said interconnecting means being so constructed that said platform maintains a fixed relation to the horizontal when in and moving between said positions, a movable ground-engaging member disposed under said platform when in loading position, means connecting said member to said frame, means for moving said member into and out of engagement with the ground, and means for moving said movable means to thereby bodily move said platform and platform frame between said positions.

13. In a vehicle of the type described in which a vehicle frame is provided having ground engaging wheels mounted on first and second longitudinally spaced axles connected to said frame, the combination of, a load-supporting platform, movable means interconnecting said platform with said frame for raising movement between a loading position to the outside of said first axle and a carrying position with the load between said first and second axles, a movable ground-engaging member extending outwardly beyond said first axle to a position under said platform when in the loading position, means pivotally connecting said member to said frame, and means interconnecting said movable means and said member for moving said movable means to thereby move said platform between said positions.

14. In a vehicle of the type described in which a vehicle frame is provided having ground engaging wheels mounted on first and second longitudinally spaced axles connected to said frame, the combination of, a load-supporting platform, movable means interconnecting said platform with said frame for raising movement between a loading position to the outside of first axle and a carrying position with the load between said first and second axles, a movable ground-engaging member extending outwardly beyond said first axle to a position under said platform when in the loading position, means pivotally connecting said member to said frame, and means interconnecting said movable means and said member for moving said movable means to thereby move said platform between said positions, said last named means and said pivotally connecting means being so constructed and arranged with respect to each other that when said last named means is actuated to move the platform between said positions reaction forces are set up through said member and interconnecting means to prevent tipping of the vehicle.

15. In a vehicle of the type described in which a vehicle frame is provided having ground engaging wheels mounted on first and second longitudinally spaced axles connected to said frame, the combination of, a load-supporting platform, movable means interconnecting said platform with said frame for raising movement between a loading position to the outside of said first axle and a carrying position with the load between said first and second axles, a movable ground-engaging member extending outwardly beyond said first axle to a position under said platform when in the loading position, means pivotally connecting said member to said frame inwardly of said first axle, and means interconnecting said movable means and said member for moving said movable means to thereby move said platform between said positions, said interconnecting means including members interconnecting said movable means with said ground-engaging member at a point between said first axle and said pivotally connecting means and another member interconnecting said movable means with said ground-engaging member at a point on the opposite side of said pivotally connecting means.

16. In a vehicle of the type described in which a vehicle frame is provided having ground-engaging wheels mounted on first and second longitudinally spaced axles connected to said frame, the combination of, a load-supporting platform, movable means including a parallelogram linkage interconnecting said platform with said frame for raising movement between a loading position to the outside of said first axle and a carrying position with the load between said first and second axles, a movable ground-engaging member extending outwardly beyond said first axle to a position under said platform when in the loading position, means pivotally connecting said member to said frame inwardly of said first axle, and means interconnecting said movable means and said member for moving said movable means to thereby move said platform between said positions, said interconnecting means including members interconnecting one of the links of said parallelogram linkage with said ground-engaging member at a point between said first axle and said pivotally connecting means and another member interconnecting said movable means with said ground-engaging member at a point on the opposite side of said pivotally connecting means.

17. In a vehicle of the type described in which a vehicle frame is provided having ground-engaging wheels mounted on first and second longitudinally spaced axles connected to said frame, the combination of, a load-supporting platform, movable means interconnecting said platform with said frame for raising movement between a loading position to the outside of said first axle and a carrying position with the load between said first and second axles, a movable ground-engaging member extending outwardly beyond said first axle to a position under said platform when in the loading position, means pivotally connecting said member to said frame inwardly of said first axle, and means interconnecting said movable means and said member for moving said movable means to thereby move said platform between said positions, said interconnecting means including extensible power members interconnecting said movable means with said ground-engaging member at a point between said first axle and said pivotally connecting means and another member interconnecting said movable means with said ground-engaging member at a point on the opposite side of said pivotally connecting means.

18. In a vehicle of the type described in which a vehicle frame is provided having ground-engaging wheels mounted on first and second longitudinally spaced axles connected to said frame, the combination of, a load-supporting platform, movable means including a parallelogram linkage interconnecting said platform with said frame for raising movement between a loading position to the outside of said first axle and a carrying position with the load between said first and second axles, a movable ground-engaging member extending outwardly beyond said first axle to a position under said platform when in the loading position, means pivotally connecting said member to said frame inwardly of said first axle, and means interconnecting said movable means and said member for moving said movable means to thereby move said platform between said positions, said interconnecting means including an hydraulic jack interconnecting one of the links of said parallelogram linkage with said ground-engaging member at a point between said first axle and said pivotally connecting means and another member interconnecting said movable means with said ground-engaging member at a point on the opposite side of said pivotally connecting means.

19. In a vehicle of the type described in which a vehicle frame is provided having ground-engaging wheels mounted on first and second longitudinally spaced axles connected to said frame, the combination of, a load-supporting platform, movable means interconnecting said platform with said frame for raising movement between a loading position to the outside of said first axle and a carrying position with the load between said first and second axles, a movable ground-engaging member extending outwardly beyond said first axle to a position under said platform when in the loading position, means pivotally connecting said member to said frame inwardly of said first axle, and means interconnecting said movable means and said member for moving said movable means to thereby move said platform between said positions, said interconnecting means including members interconnecting said movable means with said ground-engaging member at a point between said first axle and said pivotally connecting means and another member interconnecting said movable means with said ground-engaging member at a point on the opposite side of said pivotally connecting means, said members being so arranged that when said platform is moved between said positions reaction forces are set up through said ground-engaging member and said interconnecting means to prevent tipping of the vehicle.

20. In a vehicle of the type described in which a vehicle frame is provided having ground-engaging wheels mounted on first and second longitudinally spaced axles connected to said frame, the combination of, a load-supporting platform, movable means including a parallelogram linkage interconnecting said platform with said frame for raising movement between a loading position to the outside of said first axle and a carrying position with the load between said first and second axles, a movable ground-engaging member extending outwardly beyond said first axle to a position under said platform when in the loading position, means pivotally connecting said member to said frame inwardly of said first axle, and means interconnecting said movable means and said member for moving said movable means to thereby move said platform between said positions, said interconnecting means including an hydraulic jack extensible to move the platform toward its carrying position interconnecting one of the links of said parallelogram linkage with said ground-engaging member at a point between said first axle and said pivotally connecting means, and another member interconnecting said movable means with said ground-engaging member at a point on the opposite side of said pivotally connecting means, and another hydraulic jack connected to the vehicle frame and said one of the links and operable when the first named jack has reached its limit of extension to thereby raise said ground-engaging member

EDWARD R. BARRETT.